April 14, 1953  S. C. ROTH  2,634,661
CAMERA CASE WITH HOOD
Filed Dec. 9, 1949  3 Sheets-Sheet 1

Inventor
Samuel C. Roth
By Clarence A. O'Brien
and Harvey B. Jacobson
Attorneys

April 14, 1953 S. C. ROTH 2,634,661
CAMERA CASE WITH HOOD
Filed Dec. 9, 1949 3 Sheets-Sheet 2
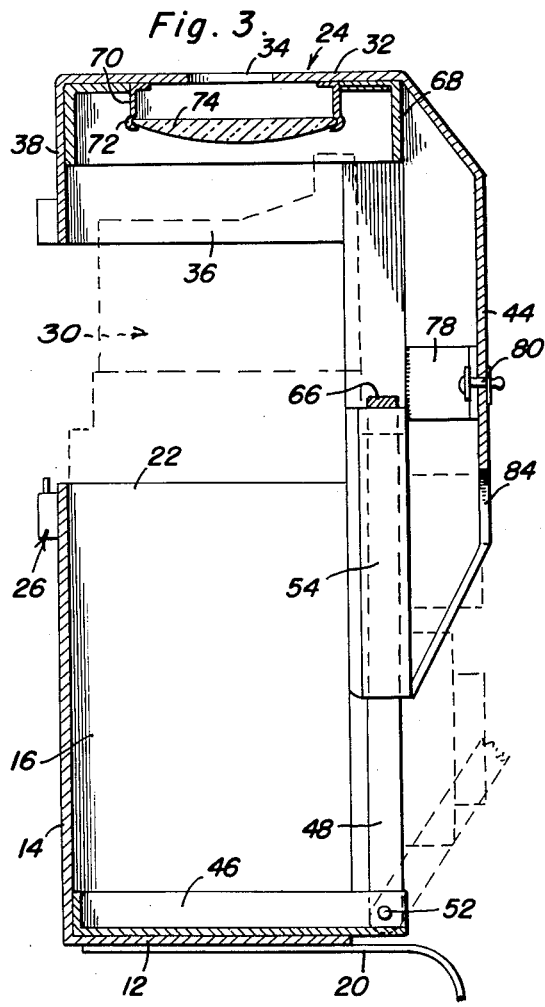
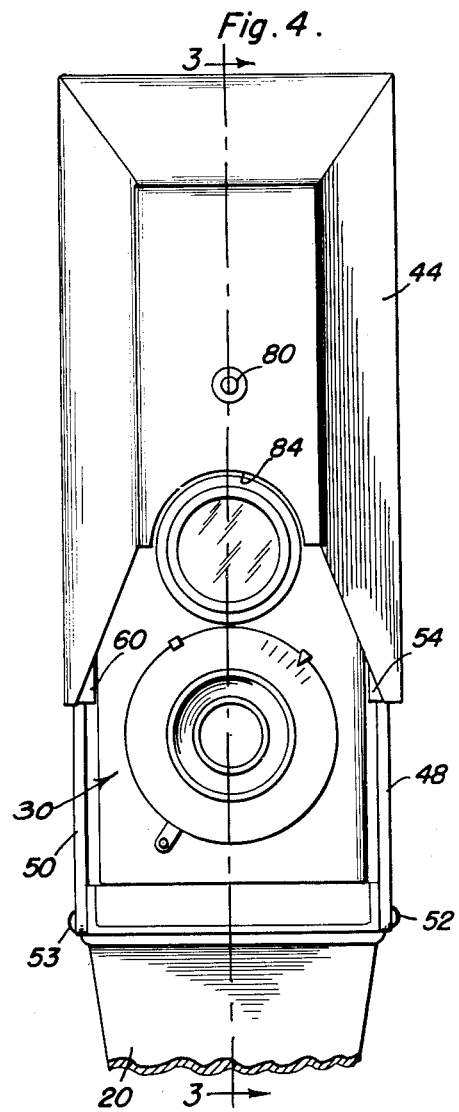
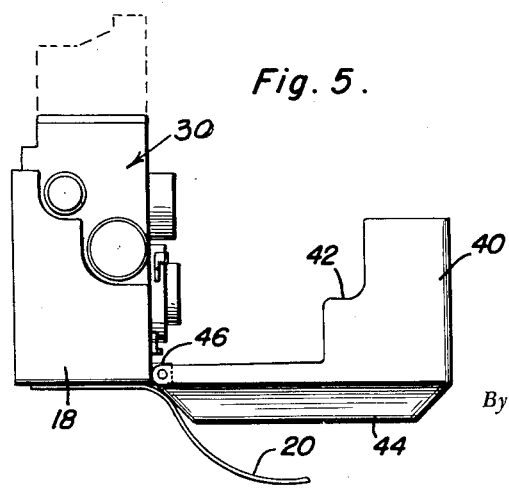
Inventor
Samuel C. Roth
By Clarence A. O'Brien
and Harvey B. Jacobson
Attorneys

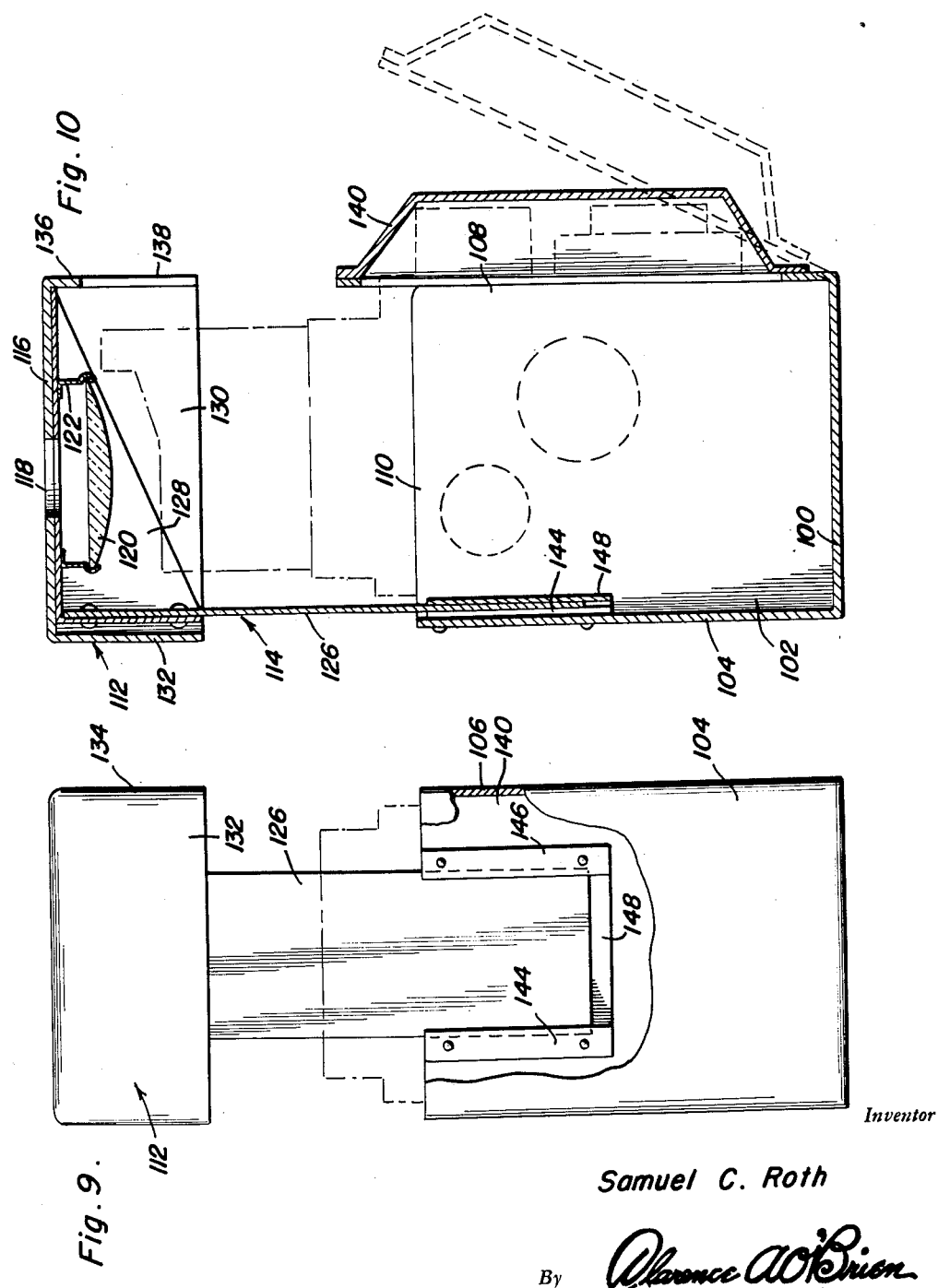

Patented Apr. 14, 1953

2,634,661

UNITED STATES PATENT OFFICE 2,634,661

CAMERA CASE WITH HOOD

Samuel C. Roth, Allentown, Pa.

Application December 9, 1949, Serial No. 131,999

5 Claims. (Cl. 95—47)

This invention relates to novel and useful improvements in a case for reflex cameras.

An object of this invention is to provide a case, for variably designed cameras of the compact reflex type which have in common a top disposed viewer with a folding and erectable hood assembly of inadequate proportions, that incorporates an auxiliary hood primarily adapted to exclude overhead light from the viewer of an encased camera under conditions that normally render the viewer inoperative.

Another object is to provide a case having a cover that is displaceable by means of an extensible frame which permits instant raising of the cover over the viewer in such arrangement that an auxiliary hood is formed which is self suspending, thus freeing the operator from the necessity of holding or adjusting extra equipment.

A further object is to provide for the holding and alignment of a lens, normally a simple magnifier, in a protected position over the viewing screen of an encased camera by means of which image brilliance is increased and which also helps to accommodate the operator's eye to the extremely short eye to viewing screen operative distance resulting from the restricted height of the auxiliary hood when positioned over the viewing screen.

Other objects such as simplicity and practicability will become apparent from the following description and explanation.

Of the drawings:

Figure 3 is a longitudinal sectional view of the device shown in Figure 1, the camera being shown in phantom.

Figure 4 is a front view of the device shown in Figure 3 and having a section line 3—3 thereon indicating the plane through which the illustration of Figure 3 is taken.

Figure 5 is a view of the cover swung out of the way when its use as an auxiliary hood is not required.

Figure 9 is a rear elevational view of another form of the invention.

Figure 10 is a longitudinal sectional view of the same embodiment of the invention as shown in Figure 9.

Figure 1:
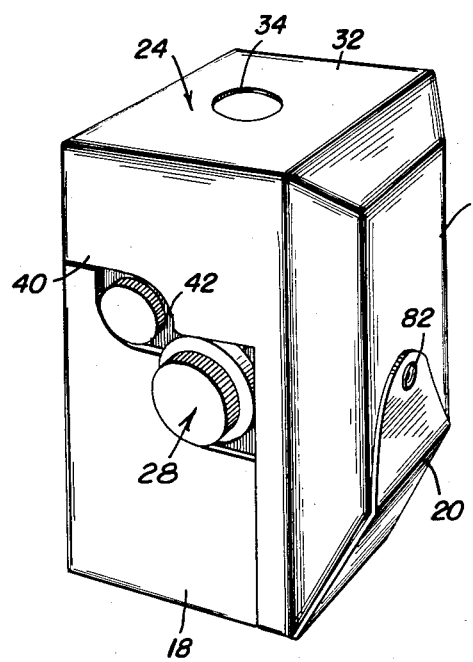
Figure 1 is a prospective view of a typical camera of the type described having a case thereon.
Figure 2:
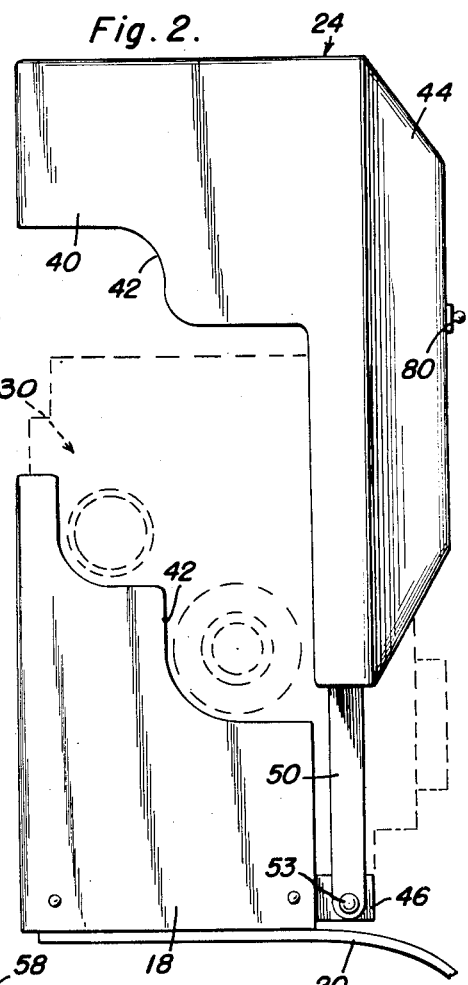
Figure 2 is an elevational view of the device of Figure 1, the cover being raised to a position where an auxiliary hood is provided for the viewing screen of the encased camera.

The instant invention is adaptable for use in connection with various types of conventional reflex cameras, a typical one of which is fragmentally shown in Figure 1 and indicated at 30 on Figures 2-5. For this type camera the case is made substantially of rectangular configuration. For other shape cameras including single lens models the outline of the case will assume substantially the same configuration as the particular camera to be encased within it.

The receptacle camera holding portion shown best in Figures 1-5, includes bottom panel 12, a back panel 14, side panels 16 and 18, and a moveable side or flap 20. This receptacle portion has an open top for exposing the viewer with its hood assembly and an open front for exposing optical equipment of the encased camera. The balance of the camera body is covered as completely as possible with the exception of cut away portions or outline where necessary as shown at 42, for avoiding camera body disposed operating protrusions thus to maintain close adherence to camera body configuration.

The displaceable cover 32 for the open top consists of a top panel 24 having a vision opening 34, together with the back panel 38 and side panels 36 and 40 which are complemental in length and outline to the receptacle portion back panel 14 and the side panels 16 and 18 in order to insure full protection to corresponding camera areas. For protecting the camera front a front panel 44, which may be made as a continuation of the top panel if manufacturing expediency so dictates, is designed to cover the open front in conjunction with the flap 20 and has a cutaway portion 34 of complemental outline to the flap. The cover side panels 36 and 40 may also be cut out to follow the exact contour of the body sides or inversely around protrusions as shown, depending upon the location of camera controls which will vary with cameras of different manufacture. In either event the body and cover sides should be as continuous as possible when the case is closed, regardless of separation outline which is unimportant, in order to give the camera maximum protection while still maintaining access to the camera controls of which the focusing knob 28 is an example. Fasteners such as 26 and 80—82 serve to keep the cover in its closed position.

Figures 6, 7:
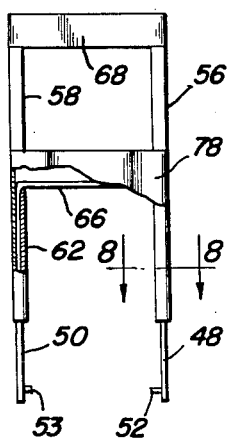
Figure 6 is an elevational view illustrating detail of an extensible frame whereby the cover may be raised and held in an elevated position over the camera viewer.
Figure 7 is a side view of the structure of Figure 6.
Figure 8:
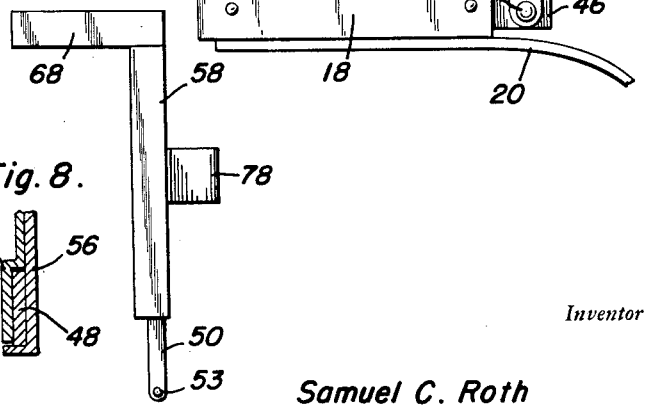
Figure 8 is an enlarged sectional view taken substantially on the lines 8—8 of Figure 6 and in the direction of the arrows.

An extensible frame is disposed in the case. This, shown separately in Figures 6-7-8, consists of an inverted reenforcing tray 68 from the foreward edge of which two L shape strips 56 and 58 depend at right angles and which are further reenforced by the strip 78 which is bent to provide space for the protruding optical equipment of the camera which it protects. Riveted to strips 56 and 58 are two stepped strips 62 that complete the friction sleeves for the legs 48 and 50 which are slideable within the sleeves. Laterally protruding from the bottom of the legs are a pair of pins 52 and 53 for engaging the legs with holes or sockets in the receptacle portion.

In order to provide substantial support for the legs 48 and 50 the receptacle portion of the case 22 has a reenforcing tray 46, similar to the inverted tray 68, at the foreward edge of which are two holes for receiving pins 52 and 53. The flexible U frame with its inherent tension formed by the two legs 48 and 50 together with the cross member 66 will insure positive attachment of the cover to the receptacle portion. This method of joining the two case components also permits swinging the cover out of the way when not needed for auxiliary hooding. The cross member 66 also limits the upward travel of the extensible frame with its attached cover portion.

In order to suspend the lens below the vision opening 34 of the cover top panel 24, an annular hanger 72 is fastened to a central opening in the tray 68 or directly to the top panel 32 if the reenforcing tray should be dispensed with. This hanger has a marginal recess near its lower edge into which the lens 74 is pressed, thus holding the lens 74 in alignment with the opening 34 at a protected plane between the vision opening and the viewer of an encased camera.

In order to lend support to the convex front panel 44, a similarly shaped support 78 is fixed to the members 56 and 58. A fastener 80 is secured to the support 78 and is passed through the front part of the panel 44 so that the complemental fastener 82 in the flap 20 is releasably locked thereto.

In operation of this form of the invention, the top 24 is raised thereby raising the panel 44 therewith. Due to the cut away portion 84 provided in the lower end of the panel 44, the various parts necessary to be exposed during operation of the camera are exposed. The top, together with the front panel is raised in amount until such time that the cross member 66 is struck by the sleeves 54 and 60. At this point, friction holds the panel 44 together with the top 24 in the raised position.

Having thus described the construction of a typical carrying case for reflex cameras incorporating an auxiliary hood for the camera viewing screen, the operation can be described as follows. The operation of the cover 32 as an auxiliary hood for the camera viewer is best shown in Figure 3 where the camera is indicated in phantom. On releasing the fasteners 26 and 80, the cover 32 which is displaceable by means of the extensible frame as described, may be raised to an exact position directly over the open hood of an encased camera. Thus the plane positioning of the cover top panel 24 and the lens 74 is exact and both will remain in this position automatically because of the friction grip of the sleeves 54 and 60 on the legs 48 and 50.

Despite the fact that the cover is also swingable to an out of the way position as shown in Figure 5, it will remain directly over the viewing screen with its hood assembly because of the backward overhang of the tray 68, the top panel 24 and the lens 74 from the point of connection with the receptacle portion.

Reference is now made to Figures 9 and 10. The ultimate operational result of this embodiment of the invention is very similar to that of the embodiment of Figure 3 and differs in construction mainly with respect to a fixed extensible frame instead of one that is pivotally attached to the case since the swingable feature is unnecessary for camera removal in this second embodiment. A case consising of a bottom 100 having sides or walls 102, 104 and 106, respectively, is provided with an open front 108 and an open top 110. The cover generally indicated at 112 is displaceable with respect to the remainder of the case, it being vertically movable. A frame generally indicated at 114 is disposed in part in the cover 112 and disposed in part within the lower part of the case. Said cover 112 consists of an upper panel 116 which has a vision opening 118 therein in alignment with the transparent panel, as the magnifier 120. This magnifier is carried by the hanger 122 which is secured to a part of the frame 114 or directly to the cover 112. Said frame consists of a leg or plate 126 which is riveted or otherwise rigidly secured to the tray 128, disposed in the top 112 and between the depending walls 130, 132 and 134, respectively. The front wall 136 has a recess 138 formed therein for accommodation of the bulged part of the closure 140.

The lower part of the frame which is secured to the lower part of the case consists of a sleeve formed of a pair of tracks 144 and 146 connected by a plate 148. Rivets or other conventional fastening devices hold the track or sleeve in place so that the plate 126 is vertically slidable therein and held in place by friction.

In this second embodiment of the invention the open front of the case is almost completely covered by the closure 140 which is movably attached to the bottom 100 in a manner similar to flap 20 in the first embodiment. In the second embodiment however, the closure 140 is held in the closed position by superimposing the front 136 of the cover 112 thereon when the latter is lowered to the closed position.

Having described the invention, what is claimed as new is:

1. In a case for a reflex camera of compact design having a top disposed viewer, said viewer being equipped with a folding and erectable hood assembly of inadequate proportions for excluding overhead light; a receptacle portion for the camera body of substantially the same configuration as the particular camera to be encased within it, having an open top for exposing said viewer with its hood assembly and an open front for exposing optical equipment of said camera, a bottom panel in said receptacle portion, a back and side panels marginally attached thereto, said panels having cut away portions for avoiding camera body disposed operating protrusions whereby to maintain close adherence to camera configuration; a swingable flap attached to said bottom panel operable over the open front; a displaceable cover for the receptacle portion having a top panel with a vision opening therein of such restricted aperture as to require proximity of one eye when using; a lens suspended in a protected position beneath and in alignment with said vision opening, depending front, back and side panels marginally attached to said top panel, the front panel being substantially complemental in length and outline to said flap, and the back and side panels being substantially complemental in length and outline to the back and side panels of the receptacle portion; an extensible frame consisting of a pair of friction sleeves vertically disposed along the forward edges of the side panels of the cover, a pair of spaced legs slideably disposed within said friction sleeves, the said legs being of length proportionate to required cover displacement to permit raising and frictionally suspending the cover top panel together with said lens over the said hood assembly, when the latter is erected, to form an auxiliary hood for the said viewer, and pivot means for attaching the bottoms of said legs to the foreward edge of the bottom panel whereby to join the cover and the receptacle portion.

2. In a case for reflex cameras of compact design having a top disposed viewer, said viewer being equipped with a folding and erectable hood assembly of inadequate proportions for excluding overhead light; a receptacle portion for the camera body of substantially the same configuration as the particular camera to be encased within it, having an open top for exposing said viewer with its hood assembly and an open front for exposing optical equipment of said camera, a bottom panel in said receptacle portion, a back and side panels attached thereto, said receptacle portion having cut away portions for avoiding camera body disposed operating protrusions whereby to maintain close adherence to camera configuration, a swingable flap attached to said bottom panel operable over the open front, a displaceable cover for the receptacle portion having a top panel with a vision opening therein of such restricted aperture as to require proximity of one eye when using, a lens suspended in a protected position beneath and in alignment with said vision opening, depending front, back and side panels attached to said top panel, the front panel being substantially complemental in length and outline to the said flap, and the back and side panels being substantially complemental in length and outline to the back and side panels of the receptacle portion, an extensible frame attached to said cover comprising a plurality of coextensive limiting and positioning legs of length proportionate to required cover displacement to permit raising the said cover whereby its top cover panel together with the said lens may be positioned over the said hood assembly, when the latter is erected, to form an auxiliary hood for the said viewer, and pivot means joining the said legs to the receptacle portion.

3. In a case for reflex cameras of compact design having a top disposed viewer, said viewer being equipped with a folding and erectable hood assembly of inadequate proportions for excluding overhead light; a receptacle portion for the camera body of substantially the same configuration as the particular camera to be encased within it, having an open top for exposing said viewer with its hood assembly and an open front for exposing optical equipment of said camera, a bottom panel in said receptacle portion, a back and side panels attached thereto, a swingable flap attached to said bottom panel operable over the open front, a displaceable cover for the receptacle portion having a top panel with a vision opening therein of such restricted aperture as to require proximity of one eye when using, a lens suspended in a protected position beneath and in alignment with said vision opening, depending front, back and side panels attached to said top panel, the front panel being substantially complemental in length and outline to the said flap, and the back and side panels being substantially complemental in length and outline to the back and side panels of the receptacle portion, an extensible frame attached to said cover comprising a plurality of coextensive limiting and positioning legs of length proportionate to required cover displacement to permit raising the said cover whereby its top cover panel together with the said lens may be positioned over the said hood assembly, when the latter is erected, to form an auxiliary hood for the said viewer, and pivot means joining the said legs to the receptacle portion.

4. In a case for reflex cameras of compact design having a top disposed viewer, said viewer being equipped with a folding and erectable hood assembly of inadequate proportions for excluding overhead light; a receptacle portion for the camera body of substantially the same configuration as the particular camera to be encased within it, having an open top for exposing said viewer with its hood assembly and an open front for exposing optical equipment of said camera, a bottom panel in said receptacle portion, a back and side panels substantially covering the back and sides of the camera body attached thereto, the said receptacle portion having cut away portions for avoiding camera body disposed operating protrusions whereby to maintain close adherence to camera body configuration, a displaceable cover for the receptacle portion having a top panel with a vision opening therein of such restricted aperture as to require proximity of one eye when using, a lens suspended in a protected position beneath and in alignment with said vision opening, depending front, back and side panels attached to said top panel, the said panels being at least of sufficient length to protect the said lens when the cover is displaced and to complement the receptacle portion whereby the viewer hood assembly and optical equipment of the camera will be covered and protected when the cover is in its normally shut position, an extensible frame consisting of a pair of sleeves vertically disposed along the foreward edges of the cover, a pair of spaced legs slideably disposed within said sleeves, the said legs being of length proportionate to required cover displacement to permit raising the said cover whereby its top cover panel together with the said lens may be positioned over the said hood assembly, when the latter is erected, to form an auxiliary hood for the said viewer, and pivot means for attaching the bottoms of said legs to the foreward edge of the bottom panel whereby to join the cover to the receptacle portion.

5. In a case for reflex cameras of compact design having a top disposed viewer, said viewer being equipped with a folding and erectable hood assembly of inadequate proportions for excluding overhead light; a receptacle portion for the camera body of substantially the same configuration as the particular camera to be encased within it, having an open top for exposing said viewer with its hood assembly and an open front for exposing optical equipment of said camera, a bottom panel in said receptacle portion, a back and side panels substantially covering the back and sides of the camera body attached thereto, a displaceable cover for the receptacle portion having a top panel with a vision opening therein of such restricted aperture as to require proximity of one eye when using, a lens suspended in a protected position beneath and in alignment with said vision opening, depending front, back and side panels attached to said top panel, the said panels being at least of sufficient length to protect the said lens when the cover is displaced and to complement the receptacle portion whereby the viewer hood assembly and optical equipment of the camera will be covered and protected when the cover is in a normally shut position, and an extensible frame disposed in said case comprising a plurality of slideably and pivotally attached coextensive limiting and positioning legs of length proportionate to required cover displacement to permit raising of said cover whereby its top panel together with the said lens may be positioned over the said hood assembly, when the latter is erected, to form an auxiliary hood for the said viewer, and whereby the said cover may be swung out of the way when auxiliary hooding is not required.

SAMUEL C. ROTH.

References Cited in the file of this patent

UNITED STATES PATENTS

| Number | Name | Date |
| --- | --- | --- |
| 403,574 | Burlingame | May 21, 1889 |
| 645,003 | Perate | Mar. 6, 1900 |
| 843,449 | Garfield | Feb. 5, 1907 |
| 2,482,248 | Coon | Sept. 20, 1949 |

FOREIGN PATENTS

| Number | Country | Date |
| --- | --- | --- |
| 319,312 | Germany | Mar. 2, 1920 |
| 545,233 | Germany | Feb. 26, 1932 |
| 617,748 | Germany | Aug. 24, 1935 |
| 621,492 | Germany | Nov. 7, 1935 |
| 637,582 | Germany | Oct. 31, 1936 |
| 643,136 | Germany | Mar. 25, 1937 |